United States Patent
Eriksson (10) Patent No.: US 9,295,362 B2
(45) Date of Patent: Mar. 29, 2016

(54) VACUUM CLEANER AGITATOR CLEANER WITH POWER CONTROL

(71) Applicant: AKTIEBOLAGET ELECTROLUX, Stockholm (SE)

(72) Inventor: Henrik Eriksson, Stockholm (SE)

(73) Assignee: Aktiebolaget Electrolux (SE)

( * ) Notice: Subject to any disclaimer, the term of this patent is extended or adjusted under 35 U.S.C. 154(b) by 309 days.

(21) Appl. No.: 13/835,691

(22) Filed: Mar. 15, 2013

(65) Prior Publication Data

US 2013/0198995 A1 Aug. 8, 2013

Related U.S. Application Data

(63) Continuation-in-part of application No. 12/405,761, filed on Mar. 17, 2009, now Pat. No. 8,601,643.

(60) Provisional application No. 61/037,167, filed on Mar. 17, 2008.

(51) Int. Cl.
*A47L 9/04* (2006.01)
*A47L 9/28* (2006.01)
*A46B 13/00* (2006.01)

(52) U.S. Cl.
CPC .............. *A47L 9/0477* (2013.01); *A47L 9/0411* (2013.01); *A47L 9/2805* (2013.01); *A47L 9/2842* (2013.01); *A47L 9/2857* (2013.01); *A47L 9/2894* (2013.01);
(Continued)

(58) Field of Classification Search
CPC ....... A47L 9/2857; A47L 9/19; A47L 9/2842; A47L 9/02; A47L 9/2894; A47L 9/2889; A47L 9/0477; A47L 9/0411; A47L 9/2805
See application file for complete search history.

(56) References Cited

U.S. PATENT DOCUMENTS

| 804,213 A | 11/1905 | Chaplin |
| 969,441 A | 9/1910 | Backer |

(Continued)

FOREIGN PATENT DOCUMENTS

| CN | 1593320 | 3/2005 |
| CN | 1816301 | 6/2006 |

(Continued)

OTHER PUBLICATIONS

Entire patent prosecution history of U.S. Appl. No. 14/467,697, filed Aug. 25, 2014, entitled, "Actuator Mechanism for a Brushroll Cleaner."

(Continued)

*Primary Examiner* — Robert Scruggs
(74) *Attorney, Agent, or Firm* — RatnerPrestia (57) ABSTRACT

A vacuum cleaner agitator system having an agitator, an electric motor to rotate the agitator, a power source, and an agitator cleaner. The cleaner moves between a first position in which it is spaced from the agitator and a second position in which it engages the agitator to remove debris while the agitator rotates. The system also has a detector configured to indicate when the cleaner is in the second position. A drive control system connects the electric motor, electric power source, and agitator cleaning detector. The drive control system has a first drive mode to drive the electric motor at a first power level, and a second drive mode, activated upon receiving an indication from the detector that the cleaner is in the second position, to drive the electric motor at a second power level that is greater than the first power level.

17 Claims, 5 Drawing Sheets

(52) U.S. Cl.
CPC .............. *A46B 13/006* (2013.01); *A47L 9/2889* (2013.01); *Y02B 40/82* (2013.01)

(56) References Cited

U.S. PATENT DOCUMENTS

| | | |
|---|---|---|
| 1,231,077 A | 6/1917 | Scheffler |
| 1,268,963 A | 6/1918 | Gray |
| 1,412,420 A | 4/1922 | Polansky |
| 1,757,461 A | 5/1930 | Losey |
| 1,813,325 A | 7/1931 | Smith |
| 1,820,350 A | 8/1931 | Dance |
| 1,907,692 A | 5/1933 | White |
| 1,965,614 A | 7/1934 | Sellers |
| 1,999,696 A | 4/1935 | Kitto |
| 2,032,345 A | 3/1936 | Cranon |
| 2,625,698 A | 1/1953 | De Kadt |
| 2,642,601 A | 6/1953 | Saffioti |
| 2,642,617 A | 6/1953 | Lilly |
| 2,663,045 A | 12/1953 | Conway |
| 2,733,000 A | 1/1956 | Sparklin |
| 2,741,785 A | 4/1956 | Siebert |
| 2,789,306 A | 4/1957 | Kath |
| 2,904,818 A | 9/1959 | Sheahan |
| 2,960,714 A | 11/1960 | Senne |
| 2,975,450 A | 3/1961 | Williams |
| 3,470,575 A | 10/1969 | Larson et al. |
| 3,536,977 A | 10/1970 | Porter |
| 3,683,444 A * | 8/1972 | Schaefer et al. ................ 15/183 |
| 3,722,018 A | 3/1973 | Fisher |
| 3,862,467 A | 1/1975 | Krickovich |
| 3,863,285 A | 2/1975 | Hukuba |
| 4,020,526 A | 5/1977 | Johansson |
| 4,084,283 A | 4/1978 | Rosendall |
| 4,171,554 A | 10/1979 | Tschudy |
| 4,173,054 A | 11/1979 | Ando |
| 4,193,710 A | 3/1980 | Pietrowski |
| 4,209,872 A | 7/1980 | Maier |
| 4,317,253 A | 3/1982 | Gut |
| 4,352,221 A | 10/1982 | Revells et al. |
| 4,370,690 A | 1/1983 | Baker |
| 4,370,777 A | 2/1983 | Woerwag |
| 4,372,004 A | 2/1983 | Vermillion |
| 4,373,228 A | 2/1983 | Dyson et al. |
| 4,398,231 A | 8/1983 | Currence |
| 4,426,751 A | 1/1984 | Nordeen |
| 4,573,235 A | 3/1986 | Baird, Sr. |
| 4,654,924 A | 4/1987 | Getz et al. |
| 4,702,122 A | 10/1987 | Richard |
| 4,802,254 A | 2/1989 | Lahndorff et al. |
| 4,847,944 A | 7/1989 | Lackner |
| 4,875,246 A | 10/1989 | MacGregor |
| 4,920,605 A | 5/1990 | Takashima |
| 4,953,253 A | 9/1990 | Fukuda |
| 4,989,293 A | 2/1991 | Bashyam |
| 5,075,922 A | 12/1991 | Tsuchida et al. |
| 5,115,538 A | 5/1992 | Cochran et al. |
| 5,121,592 A | 6/1992 | Jertson |
| 5,203,047 A | 4/1993 | Lynn |
| 5,243,732 A | 9/1993 | Koharagi et al. |
| 5,287,581 A | 2/1994 | Lo |
| 5,394,588 A | 3/1995 | Kweon et al. |
| 5,452,490 A | 9/1995 | Brundula et al. |
| 5,482,562 A | 1/1996 | Abernathy |
| 5,657,503 A | 8/1997 | Caruso |
| 5,657,504 A | 8/1997 | Khoury |
| 5,698,957 A | 12/1997 | Sowada |
| 5,974,975 A | 11/1999 | Seefried |
| 6,042,656 A | 3/2000 | Knutson |
| 6,131,238 A | 10/2000 | Weber et al. |
| 6,170,119 B1 | 1/2001 | Conrad et al. |
| 6,253,414 B1 | 7/2001 | Bradd |
| 6,266,838 B1 | 7/2001 | Caruso |
| 6,282,749 B1 | 9/2001 | Tajima |
| 6,286,180 B1 | 9/2001 | Kasper et al. |
| 6,351,872 B1 | 3/2002 | McCormick |
| 6,367,120 B2 | 4/2002 | Beauchamp |
| 6,502,277 B1 | 1/2003 | Petersson et al. |
| 6,539,575 B1 | 4/2003 | Cohen |
| 6,539,577 B1 | 4/2003 | Okuda et al. |
| 6,605,156 B1 * | 8/2003 | Clark ......................... A47L 5/30 134/18 |
| 6,810,559 B2 | 11/2004 | Mertes et al. |
| 6,883,201 B2 | 4/2005 | Jones et al. |
| 6,892,420 B1 | 5/2005 | Haan et al. |
| 7,143,461 B2 | 12/2006 | Spooner |
| 7,159,276 B2 | 1/2007 | Omoto et al. |
| 7,163,568 B2 | 1/2007 | Sepke et al. |
| 7,171,723 B2 | 2/2007 | Kobayashi et al. |
| 7,228,593 B2 | 6/2007 | Conrad |
| 7,237,298 B2 | 7/2007 | Reindle et al. |
| 7,293,326 B2 | 11/2007 | Hawkins et al. |
| 7,731,618 B2 | 6/2010 | Burlington et al. |
| 8,087,117 B2 | 1/2012 | Kapoor et al. |
| 8,418,303 B2 | 4/2013 | Kapoor et al. |
| 8,601,643 B2 | 12/2013 | Eriksson |
| 8,671,515 B2 | 3/2014 | Eriksson |
| 2002/0007528 A1 | 1/2002 | Beauchamp |
| 2004/0172769 A1 | 9/2004 | Giddings |
| 2004/0244140 A1 | 12/2004 | Joo |
| 2005/0015916 A1 | 1/2005 | Orubor |
| 2005/0015922 A1 | 1/2005 | Lim et al. |
| 2005/0091788 A1 | 5/2005 | Forsberg et al. |
| 2006/0037170 A1 * | 2/2006 | Shimizu ................ A47L 9/0477 15/319 |
| 2006/0162121 A1 * | 7/2006 | Naito et al. ...................... 15/416 |
| 2006/0272122 A1 | 12/2006 | Butler et al. |
| 2006/0288517 A1 | 12/2006 | Oh |
| 2008/0052846 A1 | 3/2008 | Kapoor |
| 2009/0229075 A1 | 9/2009 | Eriksson |
| 2010/0205768 A1 | 8/2010 | Oh |
| 2010/0313912 A1 | 12/2010 | Han |
| 2011/0035900 A1 | 2/2011 | Chae |
| 2012/0013907 A1 | 1/2012 | Jung |
| 2013/0008469 A1 | 1/2013 | Yun |
| 2013/0042429 A1 | 2/2013 | Misumi |
| 2013/0192021 A1 | 8/2013 | Eriksson |
| 2013/0192022 A1 | 8/2013 | Eriksson |
| 2013/0192023 A1 | 8/2013 | Eriksson |
| 2013/0192024 A1 | 8/2013 | Eriksson |
| 2013/0198995 A1 | 8/2013 | Eriksson |
| 2014/0259521 A1 | 9/2014 | Kowalski |
| 2014/0304941 A1 | 10/2014 | Eriksson |
| 2014/0331446 A1 | 11/2014 | Eriksson |
| 2014/0352104 A1 | 12/2014 | Eriksson |
| 2014/0359968 A1 | 12/2014 | Eriksson |
| 2014/0366300 A1 | 12/2014 | Eriksson |

FOREIGN PATENT DOCUMENTS

| | | |
|---|---|---|
| CN | 1883354 | 12/2006 |
| CN | 1816300 | 8/2009 |
| CN | 101686783 | 3/2010 |
| CN | 101984742 | 3/2011 |
| CN | 102334943 | 2/2012 |
| EP | 649625 A2 | 4/1995 |
| EP | 1415583 A1 | 5/2004 |
| EP | 1442693 | 8/2004 |
| EP | 1642520 A1 | 4/2006 |
| EP | 1994869 | 11/2008 |
| EP | 2253258 | 11/2010 |
| EP | 2273906 | 1/2011 |
| EP | 2543301 | 1/2013 |
| FR | 1068296 | 6/1954 |
| FR | 2855742 | 12/2004 |
| GB | 2000963 | 1/1979 |
| GB | 2231778 | 11/1990 |
| JP | 4944560 | 4/1974 |
| JP | 50114057 | 9/1975 |
| JP | 5095868 | 4/1993 |
| JP | 05103740 | 4/1993 |
| JP | 5305044 | 11/1993 |
| JP | 0686743 | 3/1994 |
| JP | 6086743 | 3/1994 |
| JP | 0856877 | 3/1996 |

(56) References Cited

FOREIGN PATENT DOCUMENTS

| | | |
|---|---|---|
| JP | 2003047577 | 2/2003 |
| JP | 2005160578 | 6/2005 |
| JP | 2005211426 | 8/2005 |
| JP | 2008278947 | 11/2008 |
| WO | 9210967 | 7/1992 |
| WO | 2008099583 | 8/2008 |
| WO | 2009117383 | 9/2009 |
| WO | 2010041184 | 4/2010 |
| WO | 2013060365 | 5/2013 |
| WO | 2013060879 | 5/2013 |
| WO | 2013060880 | 5/2013 |
| WO | 2013113395 | 8/2013 |
| WO | 2014094869 | 6/2014 |
| WO | 2014177216 | 11/2014 |

OTHER PUBLICATIONS

Entire patent prosecution history of U.S. Appl. No. 13/826,630, filed Mar. 14, 2013, entitled, "Brushroll Cleaning Feature With Spaced Brushes and Friction Surfaces to Prevent Contact."
Entire patent prosecution history of U.S. Appl. No. 13/826,855, filed Mar. 14, 2013, entitled, "Brushroll Cleaning Feature With Overload Protection During Cleaning."
Entire patent prosecution history of U.S. Appl. No. 13/826,934, filed Mar. 14, 2013, entitled, "Automated Brushroll Cleaning."
Entire patent prosecution history of U.S. Appl. No. 14/462,956, filed Aug. 19, 2014, entitled, "Vacuum Cleaner Brushroll Cleaner Configuration."
Entire patent prosecution history of U.S. Appl. No. 13/838,035, filed Mar. 15, 2013, entitled, "Vacuum Cleaner Agitator Cleaner With Brushroll Lifting Mechanism."
Entire patent prosecution history of U.S. Appl. No. 13/826,400, filed Mar. 14, 2013, entitled, "Brushroll Cleaning Feature With Resilient Linkage to Regulate User-Applied Force," now U.S. Pat. No. 8,671,515, issued Mar. 18, 2014.
Entire patent prosecution history of U.S. Appl. No. 12/405,761, filed Mar. 17, 2009, entitled, "Agitator With Cleaning Features," now U.S. Pat. No. 8,601,643, issued Dec. 10, 2013.
Entire patent prosecution history of U.S. Appl. No. 14/374,119, filed Aug. 25, 2014, entitled, "Cleaning Arrangement for a Nozzle of a Vacuum Cleaner."
Entire patent prosecution history of U.S. Appl. No. 14/354,460, filed Jun. 19, 2014, entitled, "Cleaning Nozzle for a Vacuum Cleaner."
Entire patent prosecution history of U.S. Appl. No. 14/354,449, filed Apr. 25, 2014, entitled, "Cleaning Nozzle for a Vacuum Cleaner."
Entire patent prosecution history of U.S. Appl. No. 14/354,466, filed Apr. 25, 2014, entitled, "Cleaning Nozzle for a Vacuum Cleaner."
International Search Report and Written Opinion for International Application No. PCT/IB2014/001050, mailed Oct. 28, 2014.
International Search Report and Written Opinion for International Application No. PCT/IB2014/001256, mailed Oct. 28, 2014.
Office Action for Application No. 200980110915.5 dated Feb. 4, 2013 (with English Translation), The State Intellectual Property Office of China.
Supplemental European Search Report for EP09721677 dated Oct. 30, 2012.
International Search Report for PCT Application No. PCT/US2009/037348 dated May 14, 2009.
Hubrick, Klaus; EPO Examiner, European Search Report for EP 09 72 1677, Oct. 30, 2012.
International Search Report for PCT International Application No. PCT/EP2011/068743 dated Jun. 14, 2012.
International Search Report for PCT International Application No. PCT/EP2012/051773 dated Sep. 17, 2012.
International Search Report for PCT International Application No. PCT/EP2012/071318 dated Jan. 3, 2013.
International Search Report for PCT International Application No. PCT/EP2012/071319 dated Dec. 11, 2012.
International Search Report for International Application No. PCT/EP2012/076620 mailed Jul. 23, 2013.
Non-Final Office Action mailed Apr. 16, 2015 for U.S. Appl. No. 14/354,460.
Notice of Allowance mailed Apr. 24, 2015 for U.S. Appl. No. 13/838,035.
Entire patent prosecution history of U.S. Appl. No. 14/702,034, filed May 1, 2015, entitled, "Cleaning Nozzle for a Vacuum Cleaner."
Notice of Allowance mailed Jun. 24, 2015 for U.S. Appl. No. 13/826,855.
Office Action mailed Jul. 7, 2015 for U.S. Appl. No. 13/826,934.
Entire patent prosecution history of U.S. Appl. No. 14/651,059, filed Jun. 10, 2015, entitled, "Cleaning Arrangement for a Rotatable Member of a Vacuum Cleaner, Cleaner Nozzle, Vacuum Cleaner and Cleaning Unit."
Entire patent prosecution history of U.S. Appl. No. 14/730,833, filed Jun. 4, 2015, entitled, "Vacuum Cleaner Agitator Cleaner With Agitator Lifting Mechanism."
Chinese Office Action issued Jul. 1, 2015 for Chinese Application No. 201310485330.X, including English language translation.
Chinese Office Action issued Jul. 14, 2015 for Chinese Application No. 201310479507.5, including English language translation.
Chinese Office Action issued Jul. 3, 2015 for Chinese Application No. 201310485943.3, including English language translation.
Chinese Office Action issued Jun. 30, 2015 for Chinese Application No. 201310485447.8, including English language translation.
International Preliminary Report on Patentability for International Application No. PCT/IB2014/001050 mailed Sep. 15, 2015.
International Preliminary Report on Patentability for International Application No. PCT/IB2014/001256 mailed Sep. 15, 2015.
Notice of Allowance mailed Sep. 10, 2015 for U.S. Appl. No. 13/826,630.
Notice of Allowance mailed Oct. 9, 2015 for U.S. Appl. No. 14/354,460.
Final Office Action mailed Nov. 30, 2015 for U.S. Appl. No. 13/826,934.
Notice of Allowance mailed Dec. 31, 2015 for U.S. Appl. No. 13/826,630.
Notice of Allowance mailed Dec. 23, 2015 for U.S. Appl. No. 14/354,460.
International Search Report and Written Opinion for International Application No. PCT/IB2015/001873, dated Feb. 4, 2016.
Notice of Allowance mailed Feb. 11, 2016 for U.S. Appl. No. 13/826,934.
Japanese Office Action dated Dec. 15, 2015 for Japanese Application No. 2014-555092 with translation.
Chinese Office Action dated Nov. 27, 2015 for Chinese Application No. 201280068532.8 with translation.

\* cited by examiner

VACUUM CLEANER AGITATOR CLEANER WITH POWER CONTROL

BACKGROUND OF THE INVENTION

1. Field of the Invention

The present invention relates generally to cleaning devices and, more specifically, to cleaning device agitators having features for removing dirt and debris from the agitator.

2. Description of the Related Art

It is well known in the art of cleaning devices to use agitators to clean surfaces such as carpets, upholstery, and bare floors. These agitators can function in a variety of ways and appear in many forms. One typical embodiment of an agitator is a tube or shaft that rotates around its longitudinal axis and has one or more features that agitate the surface as it rotates. Such features typically include one or more bristle tufts, flexible flaps, bumps, and so on. These are commonly referred to as "brushrolls," but other terms have been used to describe them. The agitator moves or dislodges dirt from the surface, making it easier to collect by the cleaning device. Agitators are useful in a variety of cleaning devices including vacuum cleaners, sweepers, wet extractors, robotic cleaners, and so on. In a sweeper, the agitator typically moves or throws the dirt directly into a receptacle. In a vacuum cleaner or similar device, the dirt may be entrained in an airflow generated by a vacuum within the cleaning device and thereby conveyed to a filter bag, cyclone separator or other kind of dirt collection device in the vacuum cleaner. U.S. Pat. No. 4,372,004, which reference is incorporated herein, provides an example of such an agitator.

It has been found that rotating agitators used in vacuum cleaners, floor sweepers, and the like, can collect a significant amount of various kinds of dirt and debris on the agitator itself. For example, the debris may include human and animal hairs, strings, threads, carpet fibers and other elongated fibers that wrap around or otherwise cling to the agitator. It has also been found that accumulated debris can reduce the performance of the agitator in a variety of ways. For example, debris may cover the agitation bristles and diminish the agitator's ability to agitate a surface. Further, debris on the agitator may impede the rotation of the agitator by wrapping around the axle or by creating additional friction with the cleaning head. If not removed, such debris can also accumulate on or migrate to the ends of the agitator and enter the bearing areas where it may cause binding, remove bearing lubrication, or otherwise generate high friction, excessive heat, or other undesirable conditions that can damage the bearings or mounting structure. In addition, debris collected on the agitator may create an imbalance in the agitator that may result in sound and/or vibrations when the agitator rotates.

Debris that has collected on an agitator is often difficult to remove because it has wrapped tightly around the agitator and intertwined with the bristles. Users of a cleaning device often must invert the device and remove the debris with manual tools such as knives, scissors or other implements. Manual removal can be unsanitary, time consuming and, if the user fails to follow instructions to deactivate the vacuum, may expose the user to contact with a moving agitator.

Some known devices use mechanisms and features to facilitate removing elongated fibers, such as string and hair, that may become wrapped around an agitator during use. For example, some agitators are provided with integral grooves that allow access by a pair of scissors or a knife blade to manually cut the fiber. Other cleaning devices use comb-like mechanisms to attempt to remove fibers. One example is shown in U.S. Pat. No. 2,960,714, which is incorporated herein by reference.

Still other devices, such as those shown in U.S. application Ser. No. 12/405,761, filed on Mar. 17, 2009 (Publication No. US 2009/0229075), which is incorporated herein by reference, use a movable blade to selectively press against the agitator to sever or abrade fibers. In the device in U.S. application Ser. No. 12/405,761, the agitator is provided with a raised support surface that provides a firm backing against which the blade presses to pinch and cut the fibers. Devices such as those in U.S. application Ser. No. 12/405,761 have been found to be effective for simple and durable user-friendly cleaning.

While various features of vacuum cleaner agitators and agitator cleaning devices are known, there still exists a need to provide alternatives, modifications, and improvements to such devices.

SUMMARY

In one exemplary embodiment, there is provided a vacuum cleaner agitator system having an agitator, an electric motor configured to rotate the agitator, an electric power source, and an agitator cleaner. The agitator cleaner is mounted adjacent the agitator and movable between a first position in which the agitator cleaner is spaced from the agitator and a second position in which the agitator cleaner engages the agitator while the agitator is being rotated by the electric motor to remove debris from the agitator. There also is an agitator cleaning detector configured to indicate when the agitator cleaner is in the second position, and a drive control system operatively connecting the electric motor, electric power source and agitator cleaning detector. The drive control system includes a first drive mode in which the drive control system connects the electric power source to the electric motor to drive the electric motor at a first power level, and a second drive mode, activated upon receiving an indication from the agitator cleaning detector that the agitator cleaner is in the second position, in which the drive control system connects the electric power source to the electric motor to drive the electric motor at a second power level. The second power level is greater than the first power level.

The recitation of this summary of the invention is not intended to limit the claims of this or any related or unrelated application. Other aspects, embodiments, modifications to and features of the claimed invention will be apparent to persons of ordinary skill in view of the disclosures herein.

BRIEF DESCRIPTION OF THE DRAWINGS

A better understanding of the exemplary embodiments may be understood by reference to the attached drawings, in which like reference numbers designate like parts. The drawings are exemplary and not intended to limit the claims in any way.

DETAILED DESCRIPTION

Figure 1:
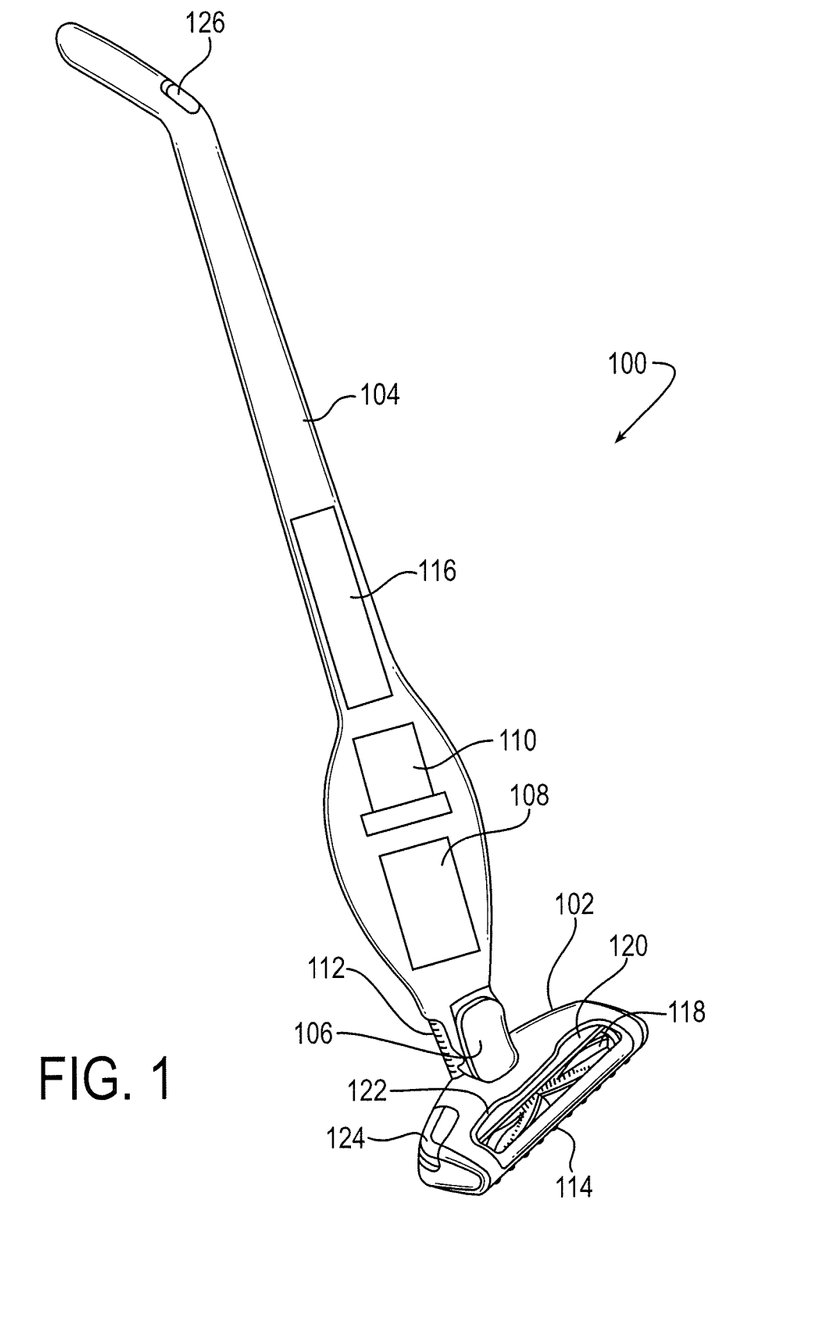
FIG. 1 is an isometric view of an exemplary upright vacuum cleaner that may incorporate one or more aspects of the present invention.

An exemplary embodiment of an upright vacuum cleaner 100 is shown in FIG. 1. In general, the vacuum cleaner 100 includes a base 102, a handle 104, and a pivot joint 106 connecting the base 102 to the handle 104.

The exemplary handle 104 includes a dirt collector 108, such as a bag chamber or cyclone separator, and a suction motor 110 (i.e., a combined impeller and electric motor) configured to suck air through the dirt collector 108. The handle 104 is connected to the base 102 by a suction hose 112, and the suction hose 112 is fluidly connected to a suction inlet 114 located on the bottom of the base 102. The vacuum cleaner 100 may be powered by a battery pack 116, a cord to a household power supply, a combination of the foregoing, or the like.

The exemplary base 102 includes a rotating floor agitator 118 and an agitator cleaner 120. These may be visible to the user through a window 122 on the surface of the base 102. A foot pedal 124 or other mechanism may be provided to operate the agitator cleaner 120. Details of the agitator 118 and agitator cleaner 120 are provided below.

The pivot joint 106 joins the base 102 to the handle 104 to allow relative movement therebetween. The pivot joint 106 may provide a single pivot axis (e.g., tilting back and forth about a pivot that extends in the lateral direction) or multiple pivot axes (e.g., tilting about a laterally-extending pivot axis and swiveling about a long axis of the handle 104 or rotating about a second pivot axis that extends in the fore-aft direction). Pivot axes may be defined by bushings, shafts, bearings, and the like, as known in the art. One or more locking mechanisms (not shown) may be provided to selectively prevent the handle 104 from pivoting about one or more axes, in order to hold the handle 104 in an upright position or for other purposes.

The vacuum cleaner 100 may include various other features. For example, the handle 104 may include a grip, storage for accessory tools, a removable cleaning hose and associated wand, and other typical features of upright vacuum cleaners. The vacuum cleaner 100 also may include supplemental filters to provide fine dust separation. Also, the locations of the various working parts, such as the suction motor 110 and dirt collector 108 may be modified, such as by placing one or both in the base 102 or inside an enlarged version of the joint 106. Other variations and modifications will be apparent to persons of ordinary skill in the art in view of the present disclosure.

Figure 2:
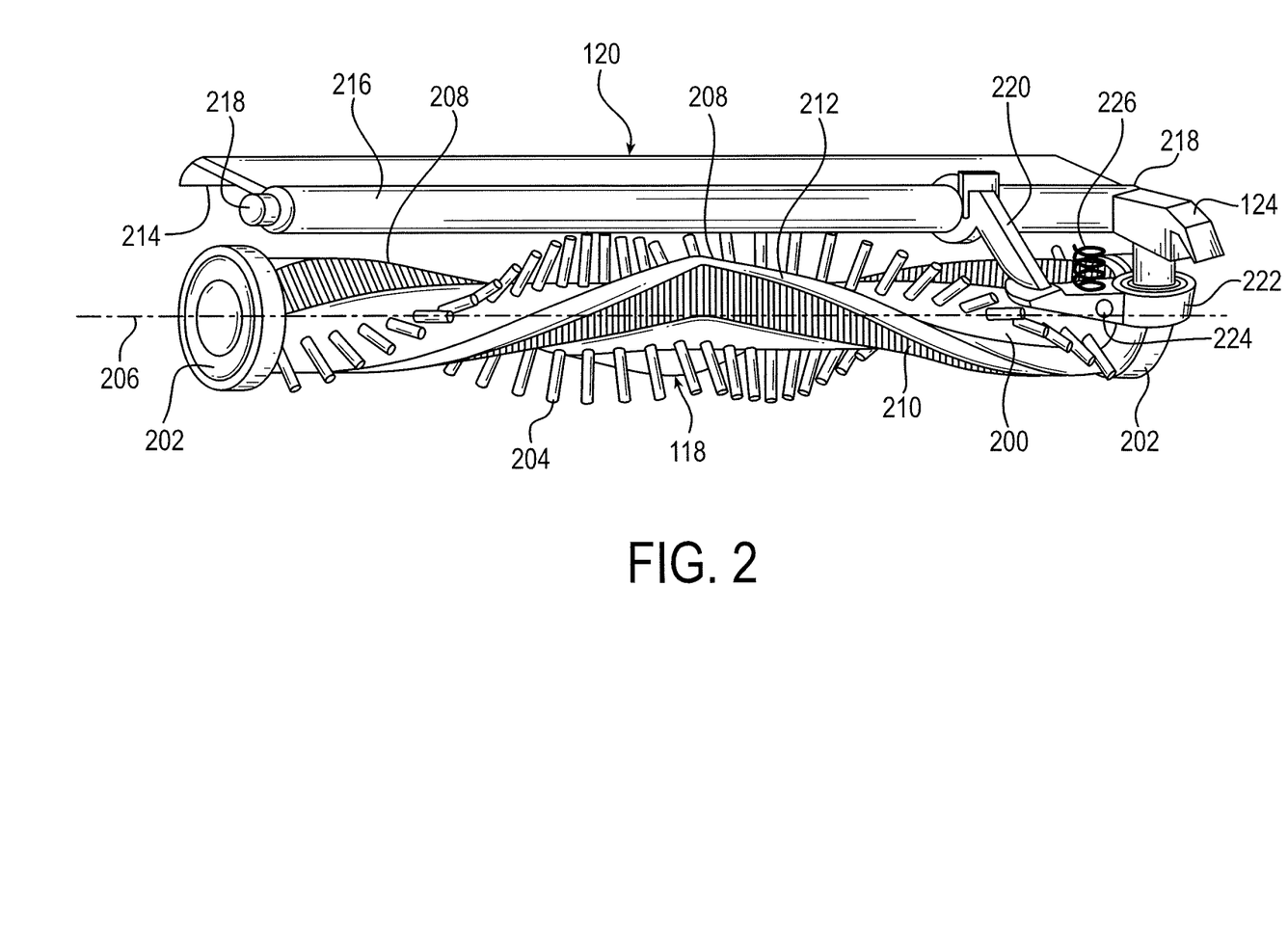
FIG. 2 is an isometric view of an exemplary agitator and agitator cleaner.

FIG. 2 illustrates an example of an agitator 118 and an associated agitator cleaner 120. The agitator 118 comprises a spindle 200 that is rotatably mounted to the base by first and second bearings 202. A plurality of agitating devices, such as bristles 204 or flaps, extend from the spindle 200 a first radial distance to extend outside the suction inlet 114 to contact an underlying surface. As used herein, the term "radial distance" refers to a distance from the spindle's rotation axis 206 to the furthest point, as measured in a plane orthogonal to the rotation axis 206, on the part in question. The bristles 204 may comprise tufts or rows of fibers. In the shown embodiment, the bristles 204 are provided as two helical rows of spaced fiber tufts. Each row reverses its helical direction at the midpoint of the spindle 200, which may be helpful to prevent the generation of lateral forces during operation and help sweep dirt to a centrally-located suction passage. Other embodiments may be modified in various ways. For example, the spaced tufts may be replaced by an arrangement of fibers that extends continuously along the spindle 200, with periodic gaps as required to avoid contact with support structures that may be located in the base 102 or suction inlet 114. Other embodiments may provide more than two helical rows, use helical rows that do not reverse direction, or reverse direction more than once or at different locations, and so on. Other variations and modifications will be apparent to persons of ordinary skill in the art in view of the present disclosure.

One or more support surfaces 208 also may extend a second radial distance from the spindle 200. The second radial distance is less than the first radial distance, and preferably is not sufficient to reach outside the suction inlet 114. This prevents the support surfaces 208 from striking the underlying surface, but this is not strictly required in all embodiments. The support surfaces 208 preferably are arranged in a pattern that matches the bristles 204, and in this case they are shaped as helixes that reverse direction at about the middle of the spindle's length. This "herringbone" pattern may help distribute loads created by the agitator cleaner 120 and provide other benefits. The support surfaces 208 also preferably extend, without any interruptions and at an essentially constant radial distance, from a first end of each support surface 208 adjacent one end of the spindle 200 to a second end of each support surface 208 located adjacent the other end of the spindle 200. This provides a continuous surface to bear against the agitator cleaner 120 throughout the agitator's full 360° rotation. This prevents the agitator cleaner 120 from moving up and down as the agitator 118 rotates, which may be uncomfortable to the operator and cause premature wear and damage.

Alternative support surfaces 208 may have other shapes, and may have different overall shapes than the agitating devices. The support surfaces 208 may include a series of radial ribs 210 with pockets between adjacent ribs 210 to assist with cleaning. The support surfaces 208 also may include outer surfaces 212 that are formed as segments of a circle centered on the spindle's rotation axis 206, which may encourage contact with the agitator cleaner 120 over a substantial arc of the agitator's rotation. The outer surfaces 212 may all be at the same radial distance from the rotation axis 206, or portions may be at different distances. For example, the left side of one of the two support surfaces 208 may taller than the right side, and the right side of the other support surface 208 may be taller than the left side. This may encourage more efficient cleaning by providing a higher contact force on a single point along each support surface 208 at any given time during rotation. Other variations and modifications will be apparent to persons of ordinary skill in the art in view of the present disclosure.

The exemplary agitator cleaner 120 comprises a cleaning member 214 that is connected to a rigid bar 216. The cleaning member 214 preferably comprises a blade-like edge that extends continuously along the portion of the spindle 200 that has bristles 204 or other agitating members extending therefrom. Gaps may be provided in the cleaning member 214 where supports or other structures would otherwise interfere with the cleaning member 214. The cleaning member 214 optionally may be made of a flexible sheet of material, such as metal, to allow some flexure to prevent the generation of excessive force against the support surfaces 208. However, other embodiments may use a cleaning member 214 made of relatively rigid metal, plastic, ceramic or other materials. While it is preferred to have a cleaning member 214 with a continuous straight edge, such as described above and shown in FIG. 1, other embodiments may use serrations or discrete teeth to form some of all of the cleaning member 214.

The bar 216, which may be integral to or separately formed from the cleaning member 214, is pivotally mounted to the base 102 by pivots 218. The pivots 218 may be mounted on bearings or bushings to offer relatively smooth rotation. The bar 216 includes an actuator, such as a lever 220, that may be manipulated to move the cleaning member 214 into engagement with the bristles 204 to cut, abrade or otherwise remove fibers from the agitator 118. The lever 220 may be operated directly, or through a linkage. For example, the lever 220 in FIG. 2 is operated by the foot pedal 124. The foot pedal 124 contacts a rocker 222 on one side of a pivot 224 on which the rocker 222 is rotatably mounted, and the rocker 222 contacts the lever 220 on the other side of the pivot 224. The rocker 222 converts a downward force applied by the foot pedal 124 into an upward force applied to the bottom of the lever 220. A spring 226 may be provided to return the parts to their starting position after the user stops pressing on the foot pedal 124. A separate spring (not shown) or other resilient linkage may be interposed between the rocker 222 and the pedal 124 or the lever 220 to limit the amount of force that can be transmitted from the pedal 124 to the lever 220. In an automated system, the rocker 222 and foot pedal 124 may be replaced by an electrical solenoid that presses on the lever 220 or bar 216, either directly or through a linkage.

The foregoing exemplary embodiment is subject to a variety of modifications. For example, in other embodiments, the cleaning member 214 may be mounted for linear reciprocation or other kinds of movement. Other embodiments may use other mechanisms to articulate the cleaning member 214, such as other linkage arrangements. Some such variations are shown in previously-incorporated references, and other variations and modifications will be apparent to persons of ordinary skill in the art in view of the present disclosure.

Figure 3A:
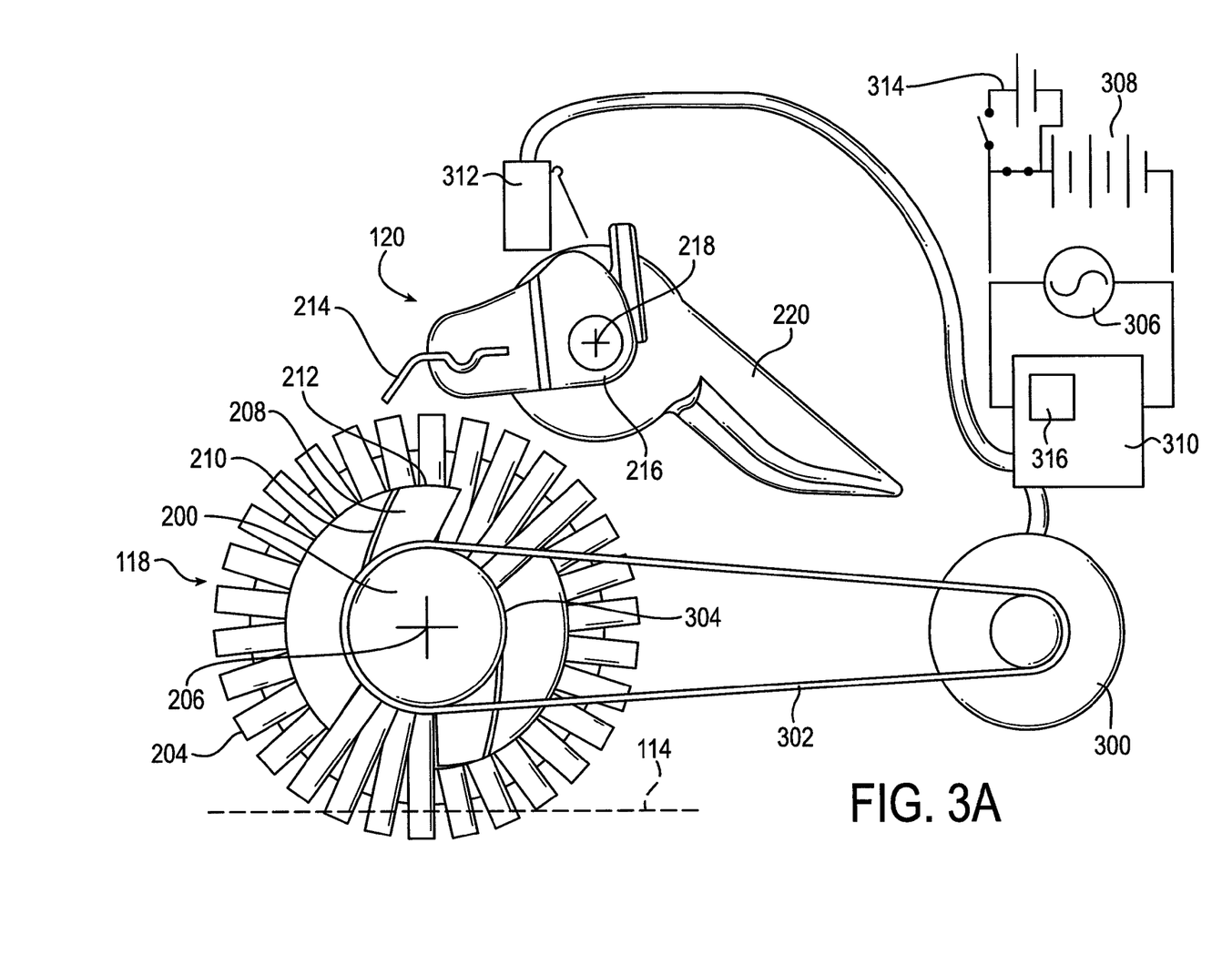
FIG. 3A is a schematic side view of an exemplary agitator cleaning system shown in the idle position.
Figure 3B:
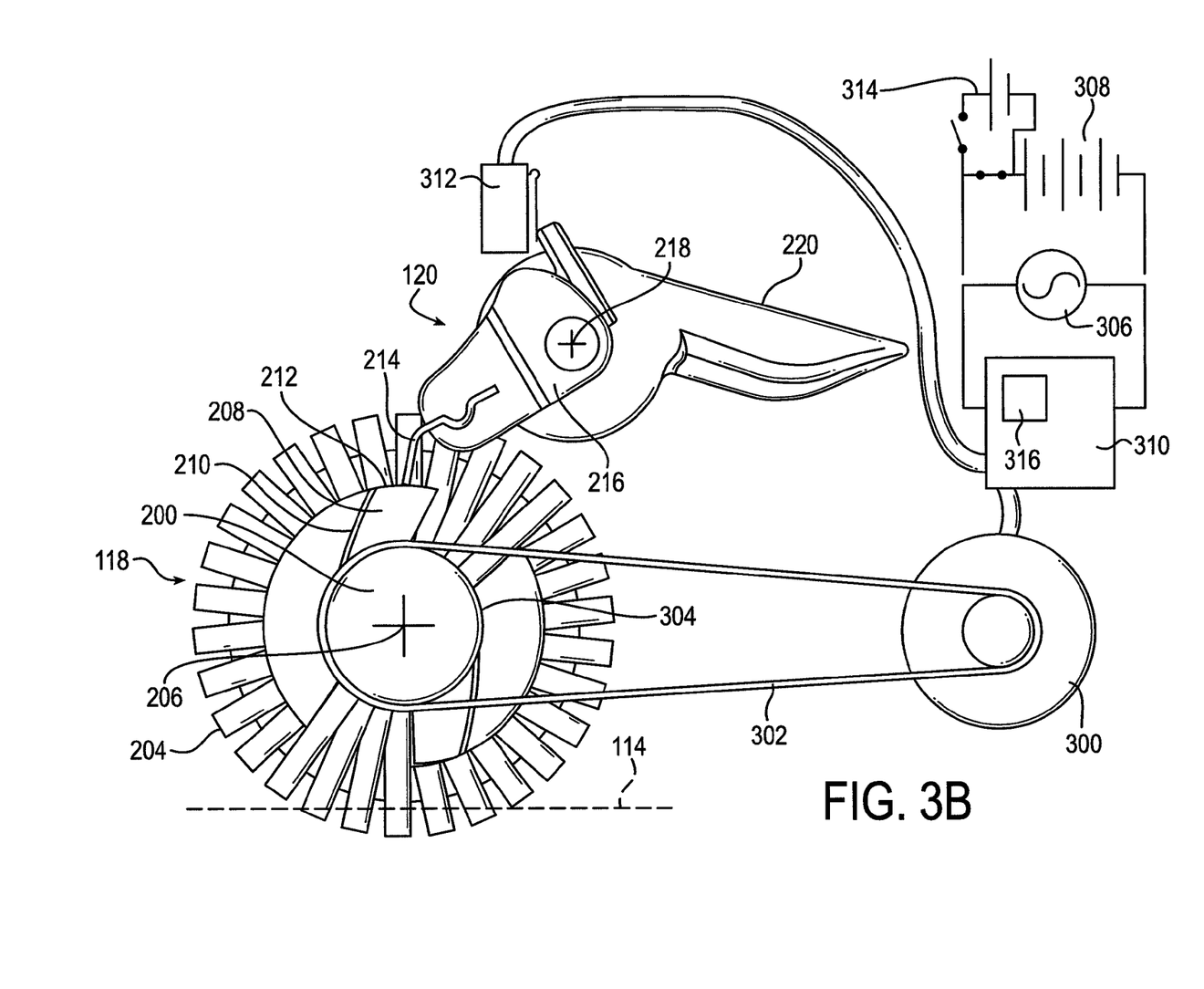
FIG. 3B is a schematic side view of the agitator cleaning system of FIG. 3A, shown in the operative position.

FIGS. 3A and 3B illustrate an exemplary agitator cleaning system incorporating the agitator 118 and agitator cleaner 120 of FIG. 2. FIG. 3A shows the system in the idle position, and FIG. 3B shows the system in the operative position. The agitator 118 is rotated by an agitator motor 300. The agitator motor 300 may comprise any suitable electric motor, and options include, but are not limited to: brushless motors, AC (alternating current) or DC (direct current) commutator motors, servomotors, phase control motors, inverter drive induction motors, reluctance motors, and the like. The agitator motor 300 may be the suction motor 110, but more preferably is a separate motor dedicated to driving the agitator 118.

The agitator motor 300 is operably connected to the agitator 118 by a belt 302, gears, or the like. In the shown embodiment, the belt 302 may wrap around a pulley 304 mounted on the agitator 118. Other embodiments may use a side drive arrangement in which a side face of the agitator 118 abuts a pulley that is separately mounted in the base 102, and interlocking teeth transfer torque from the separate pulley to the agitator 118. The latter arrangement can be used to remove the belt and pulley from the airflow path, and may be desirable in smaller devices that typically do not require belt changes.

The agitator motor 300 may be powered by an AC power source 306 or a DC power source 308 (e.g., battery 116). An electronic control unit ("ECU") 310 is provided as a motor drive controller to regulate the electric power supply to control the operation of the agitator motor 300. The ECU 310 may comprise a collection of electrical devices, including multiple separate microcomputers and other devices, or it may be integrated into a single unit. The particular control algorithm programmed into the ECU 310 can vary depending on the type of power supply (AC or DC) and the type of motor used as the agitator motor 300. For example, a DC motor may be driven by a DC power supply using an ECU 310 having solid-state controllers (transistors, thyristors, etc.) to form a "chopper" circuit control to drive the motor by frequency and/or pulse-width modulation. DC motors also may be driven using an AC power source via a suitable converter using phase control or other algorithms. AC motors may be driven by similar control circuits using triacs or other solid-state controls. Such control systems and associated hardware are generally known in the art. Non-limiting examples of control circuits and systems that may be used as the ECU 310 include those shown in U.S. Pat. Nos. 4,370,690; 4,398,231; 4,654,924; 4,920,605; 5,075,922; and 5,243,732, which are incorporated herein by reference. It is noted that certain of the foregoing controls are described for operating vacuum cleaner suction motors, but they may be used to control the agitator motor 300 instead.

The ECU 310 is controlled by a power switch 126 located on the handle 104 or base 102. When the switch 126 is activated, the ECU 310 connects the power source 306, 308 to the agitator motor 300 to drive it in a normal operation mode. In a preferred embodiment, the ECU 310 also includes a control subroutine (and possibly associated circuit elements) to increase power to the agitator motor 300 when the agitator cleaner 120 is in use. As shown in FIG. 3B, the agitator cleaner 120 can be moved to an operative position in which the cleaning member 214 engages the support surface 208. In this position, friction opposing the agitator motor's drive force is generated by contact between the cleaning member 214 and the support surface 208. Additional friction is generated as the bristles 204 contact, bend, and pass under the cleaning member 214. The total rotational resistance caused by this friction can be significant, and may slow down or even stop the agitator motor 300. While some degree of slowing may be acceptable, if the rotation of the agitator 118 decreases too much, the agitator cleaner 120 may become highly inefficient or ineffective at removing debris. Also, operating the agitator motor 300 at a reduced speed may damage the agitator motor 300 by reducing the flow of cooling air passing therethrough. For these reasons, it may be desirable to increase power to the agitator motor 300 during the agitator cleaning process, in order to prevent the agitator motor 300 from slowing too much.

One option for automatically increasing power to the agitator motor 300 is to use a speed-regulating control system to continuously drive the agitator motor 300 at a constant preset or user-adjustable speed after startup. Such systems are known in the art and need not be described herein, but examples are provided in some of the references cited above. However, such a control system would not, without separate input, be able to differentiate between an agitator cleaning operation and a fault condition. During use, objects may lock or impede the agitator, leading to a sudden and continuous increase in the agitator motor's current draw. To preserve the agitator motor 300 from damage under such conditions, agitator motor control circuits often employ overcurrent detection circuits that monitor the agitator motor's current draw and terminate operation if the current exceeds a predetermined value. In some cases, the control circuit may use both current and time as factors to terminate motor operation. For example, an overcurrent exceeding a relatively low threshold may be permitted for a relatively long time, while an overcurrent exceeding a higher threshold may be permitted for a shorter time. It has been found that agitator cleaning operations can cause overcurrent conditions that exceed the threshold value used for terminating the agitator motor 300. In such cases, a control system that simply increases power to the agitator motor 300 to continue rotating it during agitator cleaning would run afoul of controls that turn off the agitator motor 300, resulting in an unintended shut-off whenever agitator cleaning is performed. One solution to this problem, proposed in U.S. application Ser. No. 12/405,761, is to increase the overcurrent cutoff threshold during agitator cleaning, but this solution does not necessarily solve the problem of the agitator slowing down and reducing agitator cleaning efficiency.

To overcome the foregoing problem, an embodiment of an ECU 310 may include an agitator cleaning detector to determine when the agitator cleaner 120 is in the operative state, and an associated control circuit to temporarily increase power to the agitator motor 300 when the agitator cleaner 120 is operating. As shown in FIGS. 3A and 3B, the agitator cleaning detector may comprise a microswitch 312 that is turned on and off by contact with the agitator cleaner 120, but other devices, such as an optical trigger, a piezoelectric switch, or the like, may be used in other embodiments. It will be appreciated that the microswitch may be open in the position in FIG. 3A and closed in the position in FIG. 3B, or vice-versa, depending on the details of the control circuitry.

Upon activation of the microswitch 312, the ECU 310 receives a signal indicating that the vacuum cleaner 100 has been placed into the agitator cleaning state. At this time, the ECU 310 can increase power to the agitator motor 300 in any of a variety of ways. For example, when the microswitch 312 indicates to the ECU 310 that the agitator cleaner 120 is in use, the ECU 310 may close a separate circuit to connect a supplemental battery 314 in series with a DC power source 308. The design of such a control circuit is within the capabilities of persons of ordinary skill in the art without undue experimentation. One circuit suitable for connecting a supplemental battery is shown in U.S. Pat. No. 4,969,229, which is incorporated herein by reference. A similar circuit would use the microswitch to directly engage the additional power supply rather than using the ECU 310 as a relay. Other ways to increase power to operate the agitator motor 300 would be for the ECU 310 to activate a speed control circuit to operate the agitator 118 at an increased duty cycle (e.g., operating during a greater fraction of each half wave in a phase controlled motor), at an increased voltage level, at an altered phase angle, and so on. It will be readily appreciated that the requirements for increasing power to the agitator motor 300 will depend on the type of motor and the type of power supply, and control systems for effectuating this result are known in the art and will be understood by persons of ordinary skill in the art without undue experimentation. During agitator cleaning operations, any current threshold for terminating agitator motor operation may be disabled or increased, as described above.

Operating the agitator motor 300 against the resistance of the agitator cleaner 120 may cause significantly increased strain on the agitator motor 300 and its associated electronics. Thus, the load capacity of the relevant components may be increased, but this may be a relatively expensive option and it may require the use of larger and heavier components. In other embodiments, the ECU 310 may be programmed to operate at an increased power level for a predetermined time before automatically turning off the agitator motor 300 or returning to normal motor operation. For example, the ECU 310 may have a cutoff timer 316 that allows the ECU 310 to operate at an increased power level for 20 seconds before automatically returning to the normal operating state. The cutoff timer 316 preferably overrides the agitator microswitch 312, so that the ECU 310 resumes normal agitator motor 300 power control after the predetermined time, even if the user is still holding the agitator cleaner 120 in the operative position and activating the microswitch 312. One or more status indicators, such as LEDs or other lights, may be provided on the vacuum cleaner 100 to indicate that the cutoff timer 316 has terminated high-power operation and returned to the normal motor drive state. At this point, continued use of the agitator cleaner 120 may result in reduced agitator speed and an audible change in operation. Thus, the status indicator may include instructions to the user to terminate use of the agitator cleaner 120. It is also envisioned that a numerical timer or series of lights may be used to count down the cutoff timer 316.

While a cutoff timer 316 is not strictly necessary in all embodiments, it is desirable to prevent the user from inadvertently operating the agitator motor 300 at an increased power level long enough to damage the agitator motor 300 or associated systems. To prevent the user from reactivating the increased power mode too soon after returning to the normal motor driving state, the cutoff timer 316 may include a reset timer that prevents further high-power operation of the agitator motor 300 for a second predetermined time (e.g., 10 minutes). Also, to prevent a user from defeating the cutoff timer 316 (including its reset timer) by turning the vacuum cleaner 100 off and back on, the ECU 310 may include a memory structure to save the state of the cutoff timer 316 when the main switch 126 is off or the power supply disconnected.

Other features and devices may be incorporated into the foregoing embodiments, and other variations and modifications will be apparent to persons of ordinary skill in the art in view of the present disclosure. For example, the ECU 310 may comprises solid state equipment, or a collection of wires, switches, and the like. As another example, the agitator motor 300 may be integrated into the hub of the agitator 118 in a concentric design, as known in the art. As still another example, the ECU 310 may be programmed to deliberately terminate operation of the agitator motor 300 at the conclusion of the cleaning cycle and prevent reactivation for a predetermined time. Also, the exemplary embodiments are described herein in the context of a corded or cordless upright vacuum cleaner, but it will be readily apparent that other embodiments may be used in canister or central vacuum cleaner powerheads, robotic vacuum cleaners, wet extractors, and other cleaning devices having rotating agitators that are likely to experience fouling by wrapped fibers. Other variations and modifications will be apparent to persons of ordinary skill in the art in view of the present disclosure.

Figure 4A:
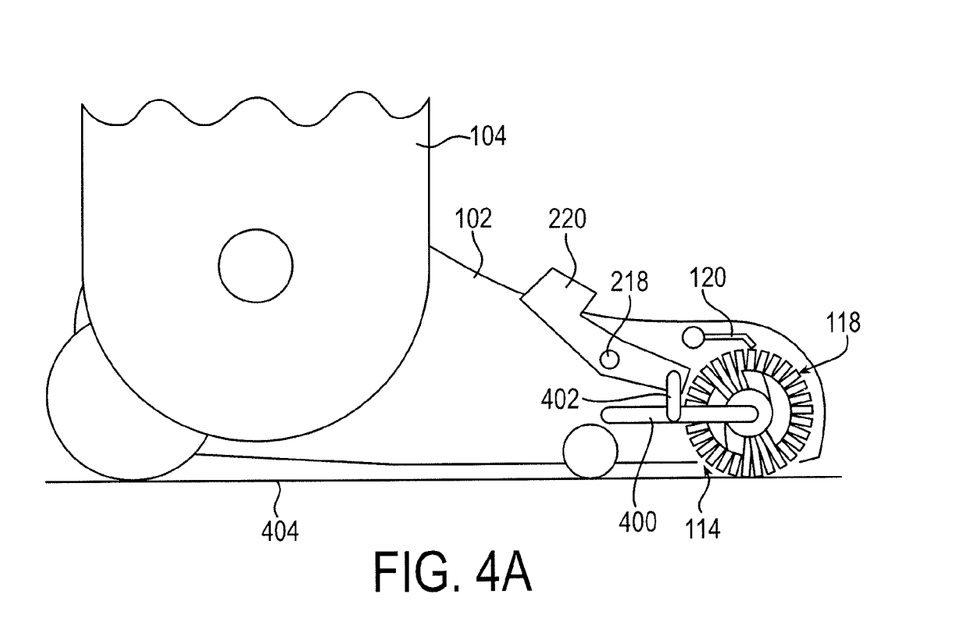
FIG. 4A is a side schematic side view of another exemplary agitator cleaning system shown in the idle position.
Figure 4B:
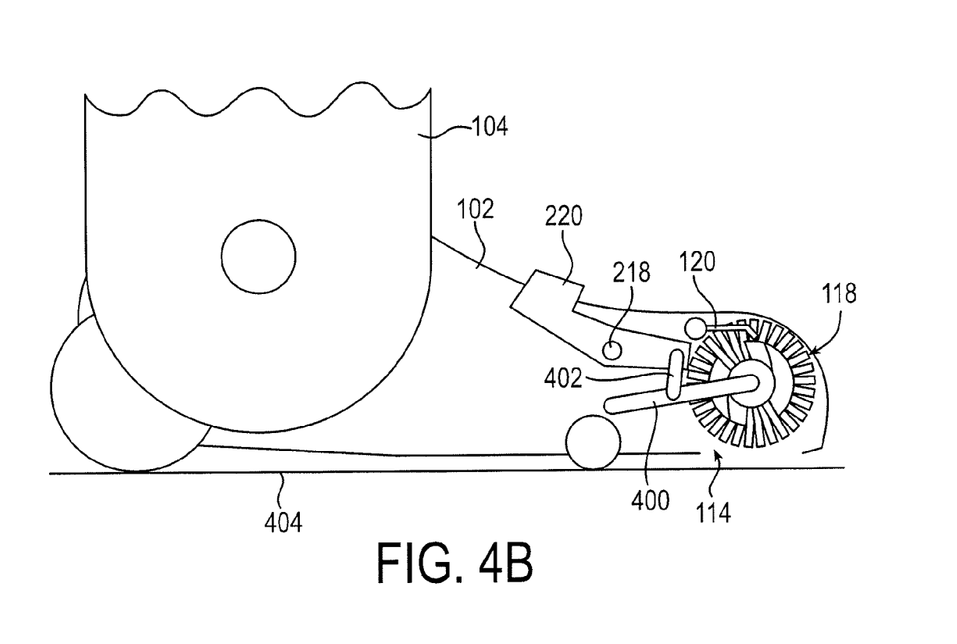
FIG. 4B is a schematic side view of the agitator cleaning system of FIG. 5A, shown in the operative position.

It will be appreciated that the foregoing power control system may be used in conjunction with any variety of agitator cleaning mechanism. For example, referring to FIGS. 4A and 4B, an alternative agitator 118 may be mounted to the base 120 on a pivot arm 400. Arrangements for mounting an agitator in this manner are known in the art, and described, for example, in U.S. Pat. No. 6,286,180, which is incorporated herein by reference. In this embodiment, the pedal lever 220 may be connected to the agitator pivot arm 400 by a linkage 402. When the lever 220 is in the idle position, shown in FIG. 4A, the agitator 118 extends outside the base 102 and can contact the underlying surface 404. When the lever 220 is depressed to the operative position, shown in FIG. 4B, the lever 220 rotates the linkage 402 and lifts the agitator 118 into the base 102 where it can no longer contact the surface 404. In this embodiment, the agitator cleaner 120 may be fixedly mounted in the base 102 at a location where the elevated agitator 118 comes into contact with it to perform the cleaning operation. In this embodiment, the microswitch 312 may be located where it is contacted by the lever 220, linkage 402, pivot arm 400, or by some other element of the system.

The present disclosure describes a number of new, useful and nonobvious features and/or combinations of features that may be used alone or together. The embodiments described herein are all exemplary, and are not intended to limit the scope of the inventions. It will be appreciated that the inventions described herein can be modified and adapted in various and equivalent ways, and all such modifications and adaptations are intended to be included in the scope of this disclosure and the appended claims.

What is claimed:

1. A vacuum cleaner agitator system comprising:
    an agitator;
    an electric motor configured to rotate the agitator;
    an electric power source;
    an agitator cleaner mounted adjacent the agitator, at least one of the agitator cleaner and the agitator being movable between a first position in which the agitator cleaner is spaced from the agitator and a second position in which the agitator cleaner engages the agitator while the agitator is being rotated by the electric motor to remove debris from the agitator;
    an agitator cleaning detector configured to indicate when the at least one of the agitator cleaner and the agitator is in the second position; and
    a drive control system operatively connecting the electric motor, electric power source and agitator cleaning detector, the drive control system comprising:
        a first drive mode in which the drive control system connects the electric power source to the electric motor to drive the electric motor at a first power level, and
        a second drive mode, activated upon receiving an indication from the agitator cleaning detector that the agitator cleaner is in the second position, in which the drive control system connects the electric power source to the electric motor to drive the electric motor at a second power level, the second power level being greater than the first power level.

2. The vacuum cleaner agitator system of claim 1, wherein the electric power source comprises an AC power source.

3. The vacuum cleaner agitator system of claim 1, wherein the electric power source comprises a DC power source.

4. The vacuum cleaner agitator system of claim 3, wherein the electric power source comprises a main battery.

5. The vacuum cleaner agitator system of claim 4, wherein the electric power source comprises a supplemental battery and the drive control system electrically connects the supplemental battery in series with the main battery when the drive control system is in the second drive mode.

6. The vacuum cleaner agitator system of claim 1, wherein the agitator cleaning detector comprises a microswitch.

7. The vacuum cleaner agitator system of claim 6, wherein the agitator cleaner is movable between the first position and the second position, and the microswitch is positioned to be contacted by the agitator cleaner when the agitator cleaner is in the second position.

8. The vacuum cleaner agitator system of claim 1, wherein the agitator cleaner is movable between the first position and the second position.

9. The vacuum cleaner agitator system of claim 1, wherein the agitator is movable between the first position and the second position.

10. The vacuum cleaner agitator system of claim 1, wherein the drive control system further comprises a cutoff timer configured to return the drive control system to the first drive mode after operating in the second drive mode for a first predetermined time.

11. The vacuum cleaner agitator system of claim 10, wherein the cutoff timer is further configured to prevent the drive control system from switching into the second drive mode for a second predetermined time following a previous operation in the second drive mode.

12. The vacuum cleaner agitator system of claim 1, wherein the agitator extends along a longitudinal direction and is configured to rotate about a rotation axis that is parallel to the longitudinal direction, and the agitator cleaner comprises a cleaning blade that extends in the longitudinal direction.

13. The vacuum cleaner agitator system of claim 1, wherein the agitator comprises:
    a spindle extending along a longitudinal direction from a first spindle end to a second spindle end, and being rotatable about a rotation axis that is parallel with the longitudinal direction;
    agitating devices arranged between the first spindle end and the second spindle end and projecting a first radial distance from the rotation axis; and
    one or more support surfaces projecting a second radial distance from the rotation axis, the second radial distance being less than the first radial distance.

14. The vacuum cleaner agitator system of claim 13, wherein the agitating devices comprise at least one helical row of bristles.

15. The vacuum cleaner agitator system of claim 13, wherein the one or more support surfaces comprise at least one helical protrusion.

16. The vacuum cleaner agitator system of claim 15, wherein the one or more support surfaces extend continuously at a uniform second radial distance from a first support surface end adjacent the first spindle end to a second support surface end adjacent the second spindle end.

17. The vacuum cleaner agitator system of claim 13, wherein:
    the agitator is mounted in a housing having an inlet nozzle;
    the agitating devices extend through the inlet nozzle when the spindle rotates; and
    the one or more support surfaces do not extend through the inlet nozzle when the spindle rotates.

* * * * *